United States Patent
Nishida et al.

(10) Patent No.: US 11,024,885 B2
(45) Date of Patent: Jun. 1, 2021

(54) ELECTRONIC APPARATUS AND CONTROL METHOD THEREOF

(71) Applicants: Tetsu Nishida, Tokyo (JP); Takatoshi Itagaki, Tokyo (JP); Noriyuki Wainai, Tokyo (JP); Yasuhiro Kinoshita, Tokyo (JP)

(72) Inventors: Tetsu Nishida, Tokyo (JP); Takatoshi Itagaki, Tokyo (JP); Noriyuki Wainai, Tokyo (JP); Yasuhiro Kinoshita, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 153 days.

(21) Appl. No.: 16/559,876

(22) Filed: Sep. 4, 2019

(65) Prior Publication Data

US 2020/0136169 A1 Apr. 30, 2020

(30) Foreign Application Priority Data

Oct. 30, 2018 (JP) .............................. JP2018-204351

(51) Int. Cl.
*G01R 31/00* (2006.01)
*H01M 10/058* (2010.01)
*H01M 10/0525* (2010.01)
*G06F 3/044* (2006.01)

(52) U.S. Cl.
CPC ........ *H01M 10/058* (2013.01); *G06F 3/0447* (2019.05); *H01M 10/0525* (2013.01)

(58) Field of Classification Search
USPC .......................... 324/426, 427, 430, 432, 433
See application file for complete search history.

(56) References Cited

U.S. PATENT DOCUMENTS

| | | | |
|---|---|---|---|
| 2014/0379285 A1* | 12/2014 | Dempsey | G01R 31/371 702/63 |
| 2017/0099199 A1* | 4/2017 | Bauer | H04L 67/22 |

FOREIGN PATENT DOCUMENTS

JP 2014-120335 6/2014

* cited by examiner

*Primary Examiner* — Vincent Q Nguyen
(74) *Attorney, Agent, or Firm* — IPUSA, PLLC

(57) ABSTRACT

An electronic apparatus includes a secondary battery; a touch panel; a deformation amount detector configured to detect a deformation amount of the secondary battery; a touch determination unit configured to determine whether the touch panel is in a touch state; and a state determination unit configured to determine a state of the secondary battery using the deformation amount detected by the deformation amount detector when the touch panel is in the non-touch state based on a determination result of the touch determination unit.

6 Claims, 5 Drawing Sheets

ELECTRONIC APPARATUS AND CONTROL METHOD THEREOF

CROSS-REFERENCE TO RELATED APPLICATIONS

This application is based on and claims priority to Japanese Patent Application No. 2018-204351, filed Oct. 30, 2018. The entire contents of Japanese Patent Application No. 2018-204351 are hereby incorporated by reference.

BACKGROUND OF THE INVENTION

1. Field of the Invention

The present invention relates to an electronic apparatus and a control method thereof.

2. Description of the Related Art

A lithium ion battery, which is one example of a secondary battery, is widely used in electronic apparatuses such as smartphones, but are known to degrade due to repeated charges and discharges. In particular, a lithium ion battery may expand due to an expansion of internal layered body due to repeated charging and discharging, or due to internal pressure increase due to electrolyte vaporization caused by a rise of internal temperature. If these lithium-ion batteries remain to be degraded, there is a risk of ignition and explosion.

Accordingly, it has been proposed to provide a pressure sensor for detecting the pressure caused by the expansion of a lithium ion battery and monitor the presence or absence of deformation of a lithium ion battery based on the output signal of the pressure sensor (see, for example, Patent Document 1).

[Patent Document 1] Japanese Patent No. 5881593

However, it is contemplated that in the technique disclosed in Patent Document 1, a pressure sensor used to detect the deformation of a lithium ion battery detects an external factor other than the expansion of the lithium ion battery, which may add to the electronic apparatus installing the lithium ion battery. Thus, detection of the external factor may prevent the state of the lithium ion battery from being accurately determined.

The external factor includes, for example, an operation performed on the touch panel by the user. The electronic apparatus, such as a smartphone, has a touch panel that is frequently operated by the user. Therefore, the status of lithium ion battery may be highly probably determined in error.

Also, even if the electronic apparatus is not used by the user, pressure applied to the electronic apparatus may be a factor of mis-determination in a state where the electronic apparatus is carried in a bag.

An object of the present invention is to enable accurate determination of the state of the lithium ion battery.

SUMMARY OF THE INVENTION

An electronic apparatus includes a secondary battery, a touch panel, a deformation amount detector configured to detect a deformation amount of the secondary battery, a touch determination unit configured to determine whether the touch panel is in a touch state, and a state determination unit configured to determine a state of the secondary battery using the deformation amount detected by the deformation amount detector when the touch panel is in the non-touch state based on a determination result of the touch determination unit.

DETAILED DESCRIPTION OF EMBODIMENTS

Figure 1:
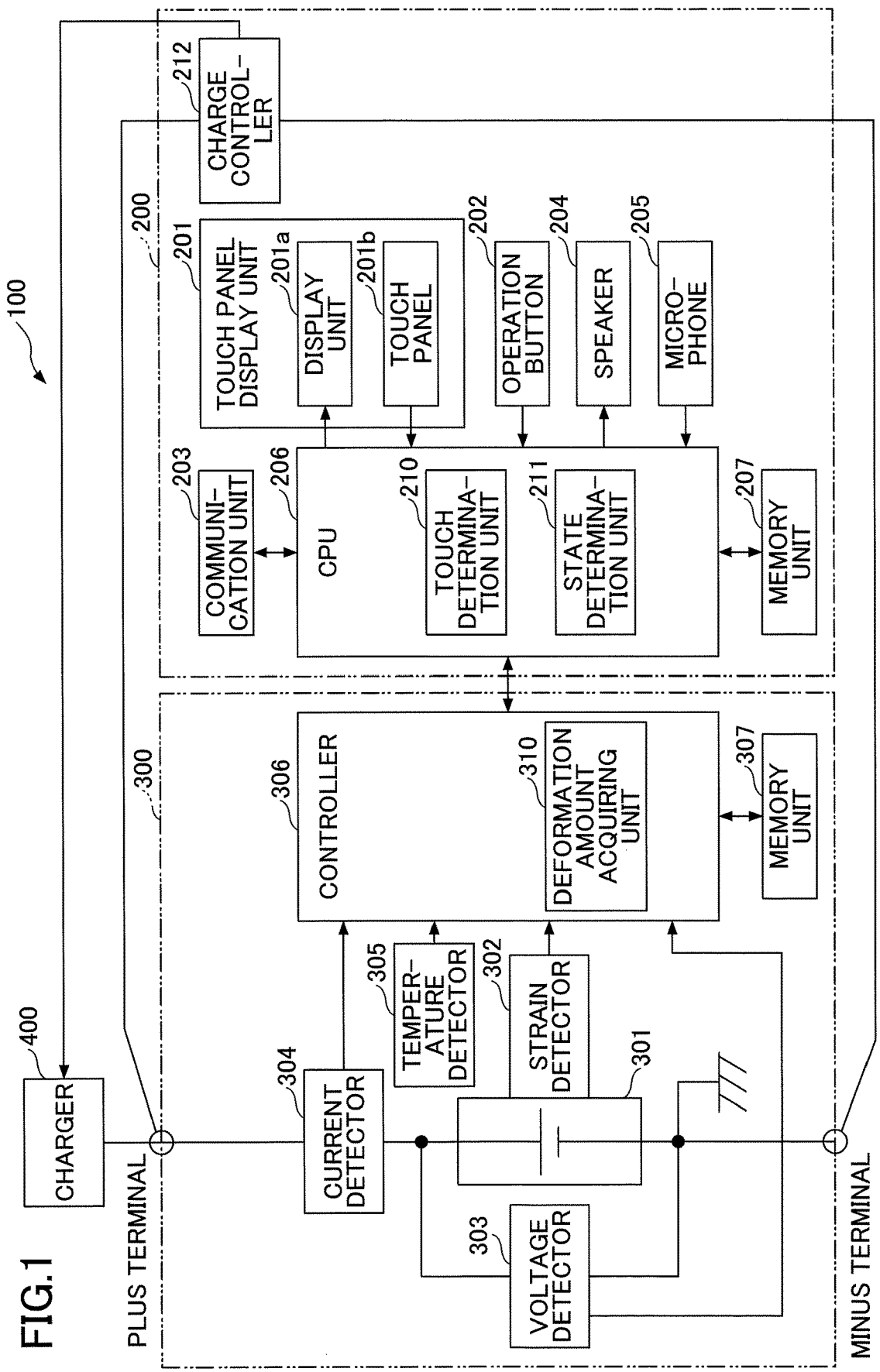
FIG. 1 is a block diagram illustrating a schematic configuration of an electronic apparatus according to a first embodiment.

Hereinafter, an embodiment of carrying out the invention will be described with reference to figures. In each figure, the same components are indicated by the same reference numerals and overlapping descriptions may be omitted.

In the embodiment described below, a smartphone is illustrated as an example of the electronic apparatus to which the present invention is applied.

First Embodiment

Hereinafter, the electronic apparatus according to the first embodiment of the present invention will be described.
[Schematic Configuration of Electronic Apparatus]

FIG. 1 is a diagram illustrating the schematic configuration of the electronic apparatus 100 according to the first embodiment.

In FIG. 1, the electronic apparatus 100 includes a main unit 200 and a battery unit 300 as a battery module. A charger 400 is connected to the battery unit 300.

The main unit 200 includes a touch panel display unit 201, an operation button 202, a communication unit 203, a speaker 204, a microphone 205, a CPU (Central Processing Unit) 206, a memory unit 207, and a charge control unit 212.

The touch panel display unit 201 includes a display unit 201a and a touch panel 201b. The touch panel 201b is laminated on the display unit 201a.

The display unit 201a is a display device such as a liquid crystal display or an organic EL display.

The touch panel 201b detects a touch of a user's finger or the like on its surface and a touched position. The touch panel 201b transmits a touch detection signal indicating that the finger, etc. is in touch with the surface and a position signal indicating a touch position on the surface to the CPU 206. The detection method of the touch panel 201b may be any of a capacitance method, a resistive film method, a surface acoustic wave method, an infrared method, a load detection method, and the like.

The operation button 202 is a power button, a volume button, or the like that receives an operation input from a user.

The communication unit 203 is, for example, a wireless communication module that performs wireless communication. The communication unit 203 supports communication standards such as 2G, 3G, 4G, and 5G or near-range radio communication standards.

The speaker 204 outputs a sound signal sent from the CPU 206 as a sound. The speaker 204 outputs, for example, the voice of a movie played in the electronic apparatus 100, music, and the voice of the other party during a call. The microphone 205 converts the input user's voice or the like into a sound signal and transmits it to the CPU 206.

The CPU 206 is a main controller that controls each portion of the main unit 200 and the battery unit 300. The CPU 206 executes instructions included in the program stored in the memory unit 207 while referring to the data stored in the memory unit 207 as necessary. The CPU 206 implements various functions based on data and instructions.

The memory unit 207 includes a memory such as a RAM (Random Access Memory) or a flash memory. The memory unit 207 stores various types of data such as setting data, detection data, and programs.

The charge control unit 212 is connected to a plus terminal and a minus terminal of the battery unit 300 and charges the lithium ion battery 301 by controlling the charger 400 based on the voltage and current of the battery unit 300.

The battery unit 300 includes a lithium ion battery 301, a strain detector 302 as a deformation amount detector, a voltage detector 303, a current detector 304, a temperature detector 305, a controller 306, and a memory unit 307.

A lithium ion battery 301 is a set of batteries to which a plurality of cell is connected, or a secondary battery composed of a single cell. The lithium ion battery 301 supplies power to each portion of the battery unit 300 and to the main unit 200. Said differently, the main unit 200 is a load apparatus for the lithium ion battery 301.

The strain detector 302 is a sensor that detects the deformation amount of the lithium ion battery 301. A strain gauge for detecting, for example, strain occurring on a measurement object as a change in an electrical resistance value is used as the strain detector 302. The resistance change of the strain detector is detected, for example, by converting to a voltage using a Wheatstone bridge circuit.

Figure 2:
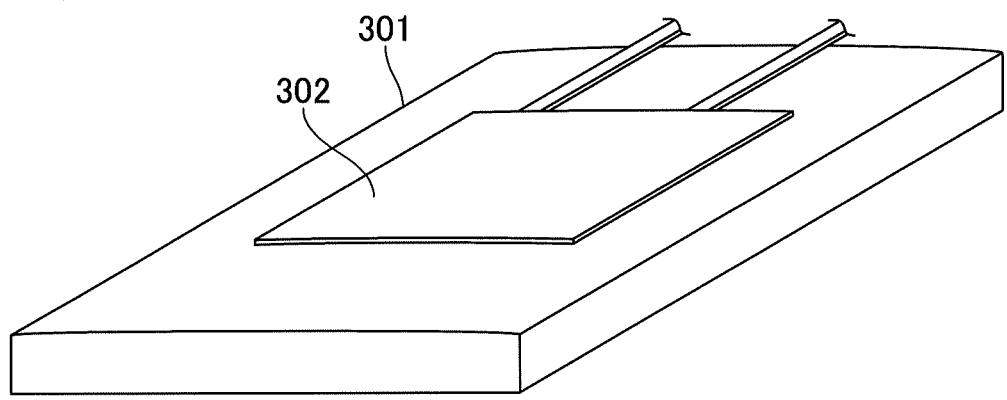
FIG. 2 illustrates a lithium ion battery to which a strain detector is attached.

The strain detector 302 is attached to the lithium ion battery 301 by a bond or the like. For example, as illustrated in FIG. 2, if the lithium ion battery 301 is like a flat plate, the strain detector 302 is attached to the front surface of the lithium ion battery 301.

The strain detector 302 is not limited to the strain gauge and may be a pressure sensor.

Returning to FIG. 1, the voltage detector 303 detects the voltage between terminals of the lithium ion battery 301 and outputs the voltage detection value to the controller 306.

A current detector 304 is provided, for example, in the charging path between the lithium ion battery 301 and the charger 400. The current detector 304 has a detection resistance and detects a charging current and a discharging current to output a current detection value to the controller 306.

The controller 306 controls each part of the battery unit 300. The controller 306 executes the instructions included in the program stored in the memory unit 307 while referring to the data stored in the memory unit 307 as necessary. The controller 306 implements various functions based on data and instructions.

The temperature detector 305 is a temperature sensor for detecting the temperature of the lithium ion battery 301 or its surrounding, and outputs the temperature detection value to the controller 306.

The memory unit 307 includes a memory such as a RAM or a flash memory. The memory unit 307 stores various types of data such as setting data, detection data, etc., and programs.

[Functional Structure of Electronic Apparatus]

Next, the functional structure implemented by the CPU 206 and the controller 306 will be described.

The controller 306 includes, for example, a deformation amount acquiring unit 310.

The deformation amount acquiring unit 310 periodically acquires the deformation amount of the lithium ion battery 301 from the strain detector 302 based on an instruction from the CPU 206. When receiving the request command of the deformation amount (acquisition data) from the CPU 206, the deformation amount acquiring unit 310 transmits the deformation amount (acquisition data) recorded in the memory unit 307 to the CPU 206.

The CPU 206 includes, for example, a touch determination unit 210 and a state determination unit 211.

Based on a touch detection signal input from the touch panel 201b to the CPU 206, the touch determination unit 210 determines whether the touch panel 201b is in a state where the user's finger or the like come into touch and a pressing pressure is applied (a touch state). The touch determination unit 210 supplies a touch determination signal to the state determination unit 211.

Because the touch panel 201b can detect the touch detection signal even when the finger or the like approaches but is actually not in touch with the touch panel, the touch determination unit 210 preferably determines that the touch detection signal is in the touch state when the touch detection signal is equal to or greater than a predetermined value.

The state determination unit 211 receives data for acquiring a deformation amount from the deformation amount acquiring unit 310. The state determination unit 211 records the input acquisition data in the memory unit 207 and determines the state of the lithium ion battery 301 based on the acquisition data. For example, when the deformation amount exceeds the predetermined threshold value, the state determination unit 211 determines that a certain degree of expansion has occurred in the lithium ion battery 301 and determines to be is an abnormal state.

When it is determined that the touch panel 201b is in the touch state based on the touch determination signal (a determination result) input from the touch determination unit 210, the state determination unit 211 discards acquisition data of the deformation amount input from the deformation amount acquiring unit 310 without recording it in the memory unit 207. Said differently, the state determination unit 211 determines the deformation amount of the lithium ion battery 301 detected when the touch panel 201b is in the touch state to include an external factor (an external noise) and does not use it for the abnormal determination, thereby increasing a determination accuracy.

When the state determination unit 211 determines the abnormal state, the state determination unit 211 notifies the user of a message representing that the lithium ion battery 301 is in the abnormal state using the display unit 201a or the speaker 204.

The deformation amount is recorded in the memory unit 207 in association with the detection time of the deformation amount. The state determination unit 211 may perform the abnormal determination on the basis of a timely change of the deformation amount (a time change rate) in addition to the determination based on the value of the deformation amount. For example, when the absolute value of the deformation amount exceeds the first threshold value and the time change rate exceeds a second threshold value, the state determination unit 211 may determine the abnormal state.

The lithium ion battery 301 possibly undergo deformation in an early stage when the electronic apparatus 100 is manufactured. In addition, there are individual variations and mounting variations in the deformation amount of the lithium ion battery 301. For this reason, it is preferable that the state determination unit 211 records one deformation amount detected by the strain detector 302 in the stable state before shipment, such as an inspection process at the time of manufacturing the electronic apparatus 100, as the initial value in the memory unit 207, and determines the threshold value used for the state determination based on the initial value.

[State Determination Operation of Lithium Ion Battery]

Next, a series of operations related to the state determination of the lithium ion battery 301 will be described in more detail.

Figure 3:
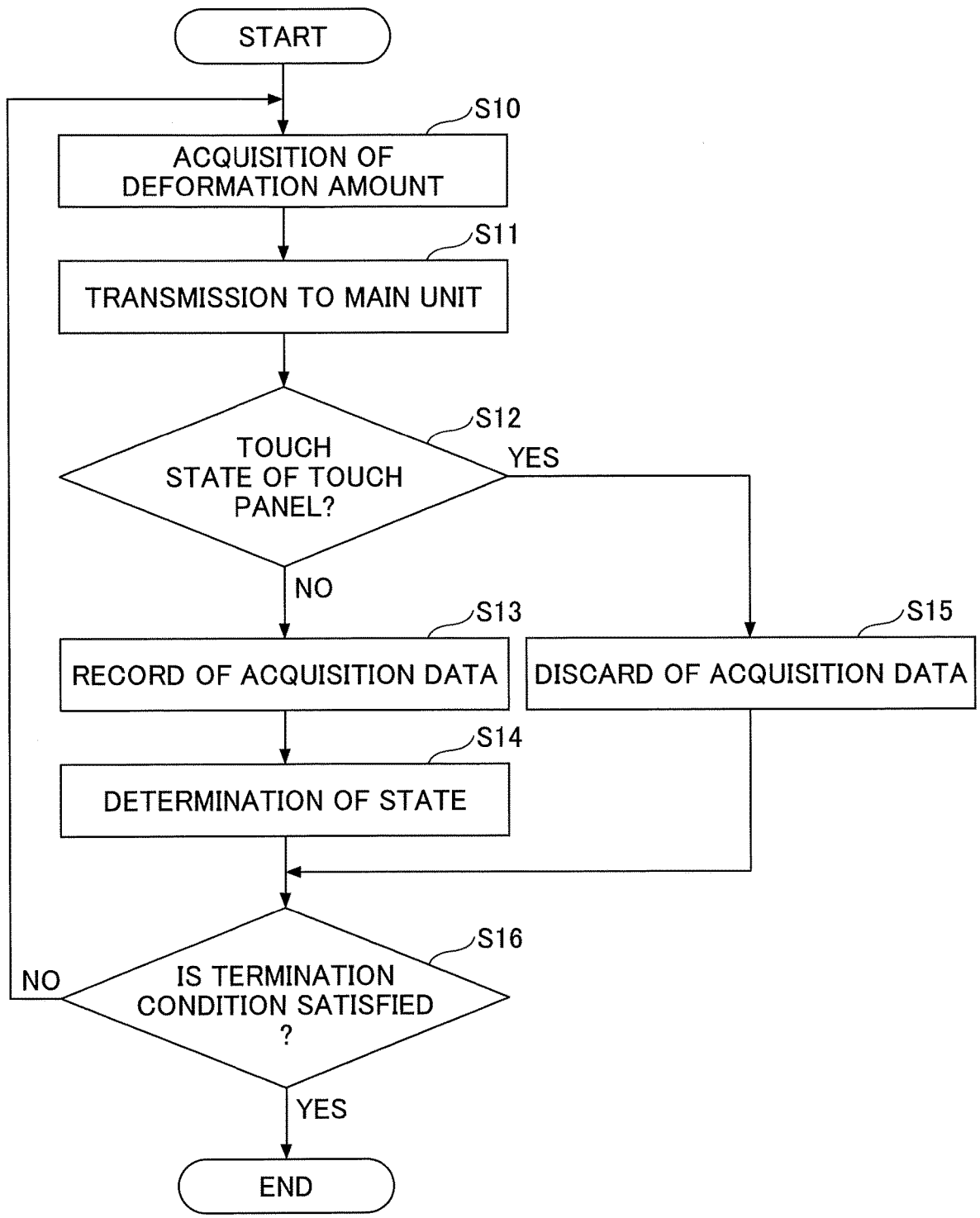
FIG. 3 is a flowchart illustrating a series of operations related to the state determination of the lithium ion battery.

FIG. 3 is a flowchart illustrating a series of operations for determining the state of the lithium ion battery 301.

Referring to FIG. 3, at first, the deformation amount acquiring unit 310 of the controller 306 acquires the deformation amount of the lithium ion battery 301 detected by the strain detector 302 based on an instruction from the CPU 206 of the main unit 200 (step S10), and transmits the acquisition data of the deformation amount to the state determination unit 211 of the CPU 206 (step S11).

In step S12, the touch determination unit 210 determines whether the touch panel 201b is in a touch state based on the touch detection signal input from the touch panel 201b.

When it is determined not to be in the touch state based on the touch determination signal input from the touch determination unit 210 (NO in step S12), the state determination unit 211 records the acquisition data received from the deformation amount acquiring unit 310 in the memory unit 207 (step S13) and determines the state of the lithium ion battery 301 (step S14). Meanwhile, when it is determined that the state determination unit 211 is in the touch state (YES in step S12), the acquisition data received from the deformation amount acquiring unit 310 is discarded without being recorded in the memory unit 207.

The CPU 206 determines whether the predetermined termination condition is satisfied (step S16), and ends the operation when the termination condition is satisfied (YES in step S16). On the other hand, when the termination condition is not satisfied (NO in step S16), the CPU 206 returns the process to step S10.

The process of acquiring the deformation amount in step S10 may be performed at a constant period. Alternatively, it may be performed when a predetermined condition is satisfied (i.e., non-periodic).

In step S11, the deformation amount acquiring unit 310 of the controller 306 acquires the deformation amount of the lithium ion battery 301 detected by the strain detector 302 based on the instruction from the CPU 206 of the main unit 200 (step S10) and transmits the acquisition data of the deformation amount to the state determination unit 211 of the CPU 206. However, the controller 306 may perform a process in which the deformation amount of the lithium ion battery 301 detected by the strain detector 302 is acquired and the data of the deformation amount is transmitted to the state determination unit 211 of the CPU 206 without using the instruction from the CPU 206.

It is also preferable that the above series of operations be performed in a standby state (a sleep state) in which the electronic apparatus 100 is not actually used by a user. This prevents false judgments from occurring due to the pressure applied in such a state that the electronic apparatus 100 are contained and carried in a bag.

[Time Change of Deformation Amount]

Figure 4:
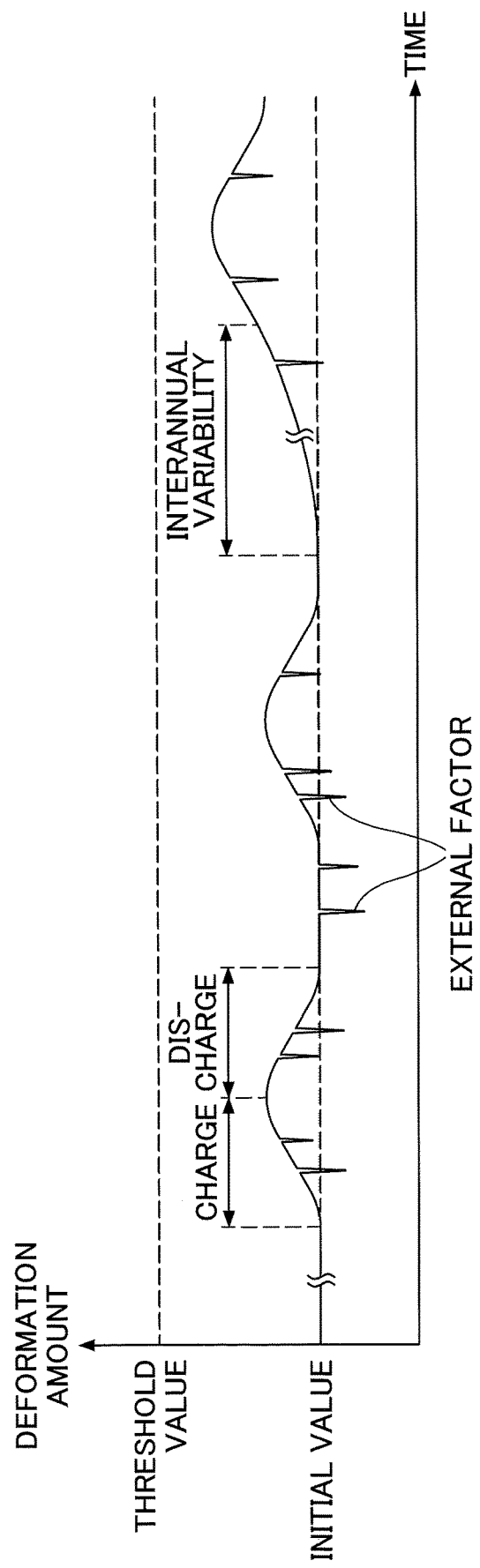
FIG. 4 is a graph illustrating time variation in the deformation amount of the lithium ion battery.

FIG. 4 is a graph illustrating the time variation of the deformation amount of the lithium ion battery 301. The deformation amount of the lithium ion battery 301 tends to increase by charging and decrease by discharging because the internal stack expands upon charging.

Also, the average value of the deformation amount of the lithium ion battery 301 tends to increase by interannual variability. This is caused by the cycling deterioration of the charge and discharge of the lithium ion battery 301, the neglect of the electronic apparatus 100 at high temperatures, and the deformation of the lithium ion battery 301 due to dropping of the electronic apparatus 100.

Further, the deformation amount of the lithium ion battery 301 temporarily varies due to an external factor such as the operation of the touch panel 201b by the user and the external pressure applied while carrying the electronic apparatus 100.

In FIG. 4, the external factor acts in the direction of reducing the deformation amount (a direction in which the lithium ion battery 301 contracts), but it is also possible that the external factor acts in the direction of increasing the deformation amount (a direction in which the lithium ion battery 301 expands) depending on the conditions such as the position of the strain detector 302 attached to the lithium ion battery 301.

In the electronic apparatus 100 of this embodiment, because the data of the deformation amount data during a period when the external factor described above acts is not used to determine the state of the lithium ion battery 301, the state of the lithium ion battery 301 can be accurately determined.

In addition, because the threshold value is set based on the initial value in the state determination, it is possible to suppress the false determination based on the individual difference, the mounting variation, or the like of the lithium ion battery 301.

Second Embodiment

Hereinafter, the electronic apparatus according to the second embodiment of the present invention will be described.

The electronic apparatus according to the second embodiment differs from the first embodiment in the series of operations related to the state determination of the lithium ion battery 301. Because the other configurations are the same as those of the first embodiment, only different points will be described below.

Figure 5:
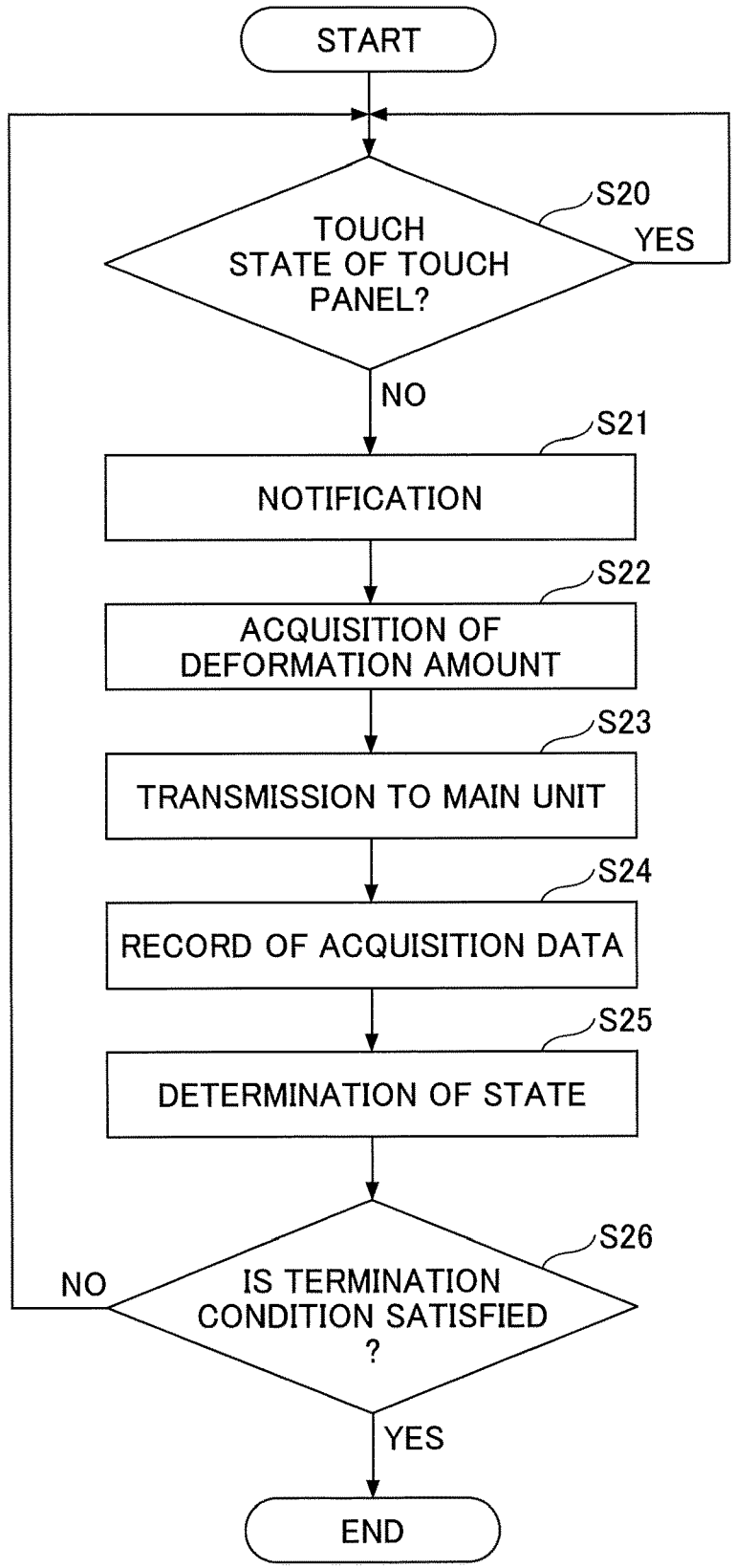
FIG. 5 is a flowchart illustrating a series of operations related to the state determination of the lithium ion battery according to a second embodiment.

FIG. 5 is a flowchart illustrating a series of operations involved in determining the state of the lithium ion battery 301.

Referring to FIG. 5, at first, the touch determination unit 210 of the CPU 206 determines whether the touch panel 201b is in a touch state based on a touch detection signal input from the touch panel 201b (step S20). When the touch panel 201b is in the touch state (YES in step S20), the touch determination unit 210 repeats the determination of the touch state (step S20).

When the touch panel 201b is not in the touch state, that is, when the touch panel 201b is in the non-touch state (NO in step S20), the touch determination unit 210 notifies the deformation amount acquiring unit 310 of the controller 306 that the touch panel 201b is in the non-touch state (step S21).

The touch determination unit 210 may notify after a passage of a predetermined period of time after the touch panel 201b becomes the non-touch state.

The deformation amount acquiring unit 310 acquires the deformation amount of the lithium ion battery 301 detected by the strain detector 302 (step S22) and transmits the acquisition data of the deformation amount to the state determination unit 211 of the CPU 206 based on the instruction from the CPU 206 of the main unit 200.

The state determination unit 211 records the acquisition data received from the deformation amount acquiring unit 310 in the memory unit 207 (step S24) and performs the state determination of the lithium ion battery 301 (step S25).

The CPU 206 determines whether a predetermined termination condition is satisfied (step S26), and ends the operation when the termination condition is satisfied (YES in step S26). On the other hand, when the termination condition is not satisfied (NO in step S26), the CPU 206 returns the process to step S20.

In this embodiment, as in the first embodiment, because the data of the deformation amount during the period when the external factor acts is not used to determine the state of the lithium ion battery 301, the state of the lithium ion battery 301 can be accurately determined.

In the present embodiment, it is preferable to record one deformation amount detected by the strain detector 302 as an initial value, such as the inspection process at the time of manufacturing the electronic apparatus, and determine the threshold value to be used for the state determination based on the initial value.

As described above, in the first embodiment, when the touch panel 201b is in the non-touch state, the detected value (deformation amount) detected by the strain detector 302 is discarded, while in the second embodiment, when the touch panel 201b is in the non-touch state, detection by the strain detector 302 is not performed.

In both the first embodiment and the second embodiment, the state of the lithium ion battery 301 is determined based on the deformation amount of the lithium ion battery 301 detected when the touch panel 201b is in the non-touch state based on the result of determining whether the touch panel 201b is in the touch state.

Regardless of whether the touch panel 201b is in the touch state or the non-touch state, the deformation amount may be detected and recorded in a storage unit, and when performing the state determination, the deformation amount detected when the touch panel 201b is in the non-touch state may be acquired from the memory unit to perform the state determination.

In the above embodiments, the deformation amount acquiring unit 310 is provided inside the controller 306, but the deformation amount acquiring unit 310 may be provided inside the CPU 206.

In each of the above embodiments, the CPU 206 and the controller 306 are separately provided, but these may be configured by a single arithmetic processing unit.

The deformation amount acquiring unit 310 of the controller 306 may be configured to acquire the deformation amount of the lithium ion battery 301 detected by the strain detector 302 based on an instruction from the CPU 206 of the main unit 200 and transmit the acquisition data of the deformation amount to the state determination unit 211 of the CPU 206. However, the controller 306 may be configured to acquire the deformation amount of the lithium ion battery 301 detected by the strain detector 302 and transmit the acquisition data of the deformation amount to the state determination unit 211 of the CPU 206 without using an instruction from the CPU 206.

Further, in the above embodiments, the state determination unit 211 notifies that the lithium ion battery 301 is in the abnormal state when it is determined that the lithium ion battery 301 is in the abnormal state. However, in addition to this, or alternatively, when it is determined that the lithium ion battery 301 is in the abnormal state, the state determination unit 211 may change the charging method or the charging condition by giving an instruction to the deformation amount acquiring unit 310.

In the above embodiments, the smartphone has been exemplified as the electronic apparatus. However, the present invention is not limited to the smartphone and can be applied to various electronic apparatuses.

According to the present invention, the state of a lithium ion battery can be accurately determined.

While the preferred embodiments of the invention have been described in detail above, the invention is not limited to the embodiments described above, and various modifications and substitutions can be made to the embodiments described above without departing from the scope of the invention.

EXPLANATION OF SYMBOLS

100 Electronic apparatus
200 Main unit
201 Touch panel indicator
201a Display unit
201b Touch panel
210 Touch determination unit
211 State determination unit
300 Battery unit
301 Lithium ion battery
302 Strain detector (Deformation amount detector)
306 Controller
310 Deformation amount acquiring unit
400 Charger

What is claimed is:

1. An electronic apparatus comprising:
a secondary battery;
a touch panel;
a deformation amount detector configured to detect a deformation amount of the secondary battery;
a touch determination unit configured to determine whether the touch panel is in a touch state; and
a state determination unit configured to determine a state of the secondary battery using the deformation amount detected by the deformation amount detector when the touch panel is in the non-touch state based on a determination result of the touch determination unit.

2. The electronic apparatus according to claim 1,
wherein the state determination unit determines an abnormal state when a value of the deformation amount exceeds a predetermined threshold value.

3. The electronic apparatus according to claim 2,
wherein the state determination unit records one of the deformation amounts detected by the deformation amount detector as an initial value and determines the predetermined threshold value based on the initial value.

4. The electronic apparatus according to claim 2,
wherein the state determination unit determines the state based on a time change rate of the deformation amount in addition to the value of the deformation amount.

5. The electronic apparatus according to claim 1, wherein the deformation amount detector is a strain gauge or a pressure sensor.

6. A control method for controlling an electronic apparatus, the electronic apparatus including a secondary battery, a touch panel, and a deformation amount detector for detecting a deformation amount of the secondary battery, the control method comprising:
- a touch determination step of determining whether the touch panel is in a touch state, and
- a state determination step of determining a state of the secondary battery using the deformation amount detected by the deformation amount detector when the touch panel is in a non-touch state based on the determination result in the touch determination step.

* * * * *